United States Patent
Manabe et al.

(10) Patent No.: US 7,825,966 B2
(45) Date of Patent: Nov. 2, 2010

(54) HIGH DYNAMIC RANGE SENSOR WITH BLOOMING DRAIN

(75) Inventors: Sohei Manabe, San Jose, CA (US);
Ashish Shah, Milpitas, CA (US);
Sasidhar Saladi, Santa Clara, CA (US);
William Qian, Los Gatos, CA (US);
Hidetoshi Nozaki, Santa Clara, CA (US); Nagaraja Satyadev, San Jose, CA (US); Hsin-Chih (Dyson) Tai, Cupertino, CA (US); Howard M. Rhodes, San Martin, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 487 days.

(21) Appl. No.: 11/872,521

(22) Filed: Oct. 15, 2007

(65) Prior Publication Data
US 2009/0002528 A1    Jan. 1, 2009

Related U.S. Application Data

(60) Provisional application No. 60/947,347, filed on Jun. 29, 2007.

(51) Int. Cl.
*H04N 5/335*    (2006.01)
(52) U.S. Cl. ..................... 348/248; 348/309
(58) Field of Classification Search .............. 348/248, 348/296, 307, 308, 309
See application file for complete search history.

(56) References Cited

U.S. PATENT DOCUMENTS

| | | | |
|---|---|---|---|
| 6,727,946 B1 | 4/2004 | Zhao et al. | |
| 7,626,626 B2 * | 12/2009 | Panicacci | 348/308 |
| 2004/0096124 A1 * | 5/2004 | Nakamura | 382/308 |
| 2006/0071254 A1 | 4/2006 | Rhodes | |
| 2006/0256221 A1 * | 11/2006 | Mckee et al. | 348/308 |
| 2007/0040922 A1 * | 2/2007 | McKee et al. | 348/308 |
| 2007/0063127 A1 * | 3/2007 | Bock | 250/208.1 |
| 2007/0206110 A1 * | 9/2007 | Wada | 348/340 |
| 2008/0018765 A1 * | 1/2008 | Choi et al. | 348/308 |
| 2009/0008532 A1 * | 1/2009 | Setoguchi | 250/208.1 |

* cited by examiner

*Primary Examiner*—John M Villecco
*Assistant Examiner*—Kent Wang
(74) *Attorney, Agent, or Firm*—Lathrop & Gage LLP (57) ABSTRACT

An image sensor has at least two photodiodes in each unit pixel. A high dynamic range is achieved by selecting different exposure times for the photodiodes. Additionally, blooming is reduced. The readout timing cycle is chosen so that the short exposure time photodiodes act as drains for excess charge overflowing from the long exposure time photodiodes. To improve draining of excess charge, the arrangement of photodiodes may be further selected so that long exposure time photodiodes are neighbored along vertical and horizontal directions by short exposure time photodiodes. A microlens array may also be provided in which light is preferentially coupled to the long exposure time photodiodes to improve sensitivity.

15 Claims, 14 Drawing Sheets

HIGH DYNAMIC RANGE SENSOR WITH BLOOMING DRAIN

CROSS REFERENCE TO RELATED APPLICATIONS

The present application claims the benefit of and priority to U.S. Provisional Application No. 60/947,347, filed on Jun. 29, 2007.

FIELD OF THE INVENTION

The present invention is generally related to high dynamic range image sensors. More particularly the present invention is directed to inhibiting blooming in a high dynamic range image sensor.

BACKGROUND OF THE INVENTION

High dynamic range (HDR) image sensors are required for many applications. Many current generation image sensors, including CCD and CMOS image sensors, have about 70 dB dynamic range. However, to match the capabilities of the human eye requires a dynamic range of up to about 100 dB. For example, an image sensor for automobile applications requires more than 100 dB dynamic range to deal with different driving conditions, such as driving through a dark tunnel into bright sunshine. Additionally, some digital still camera (DSC) sensors may need more than 90 dB dynamic range.

Many high dynamic range sensors have been proposed but each has significant drawbacks. Some of the drawbacks of previous HDR sensors include an image degradation due to fixed pattern noise, large random noise, and a reduced resolution associated with blooming.

An image sensor generates charge during an exposure time period, which is subsequently read out during a readout phase. However, a photodiode can accumulate only a certain amount of charge during an exposure time period, which limits dynamic range. One approach in the prior art to increase the dynamic range is to use a charge skimming operation to implement an exposure time control method to extend the dynamic range, which is illustrated in FIGS. 1A-1E.

Figure 1A:
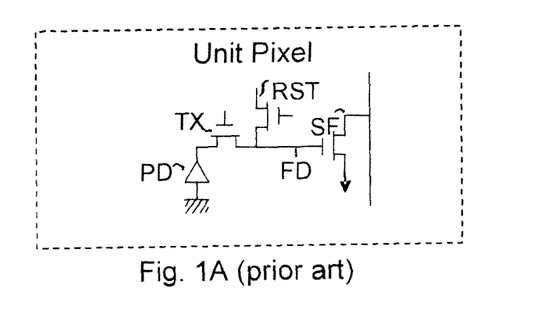
FIGS. 1A, 1B, 1C, 1D, and 1E illustrate aspects of charge skimming techniques used to achieve a high dynamic range in accordance with the prior art.

FIG. 1A illustrates a conventional unit pixel 100 having a photodiode (PD), transfer transistor (TX), reset transistor (RST), and source-follower (SF) amplifier. A conventional floating diffusion (FD) node is also illustrated. The photodiode is a pinned photodiode or common n-type photodiode.

Figure 1B:
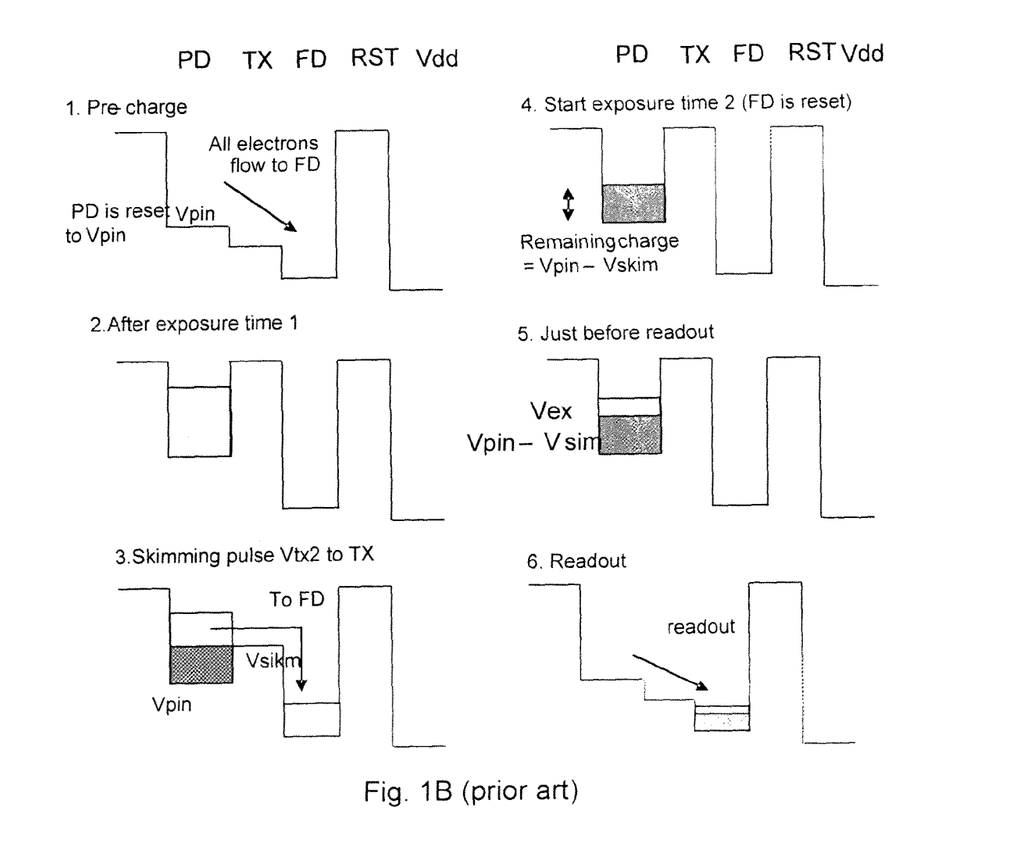

FIG. 1B illustrates the potential diagram across the unit pixel at different times (in plots 1, 2, 3, 4, 5, and 6) for the exposure control method illustrating the potential at the PD. TX, FD, and RST. The first plot illustrates a pre-charge phase in which the photodiode is reset with the TX gate being driven to Vtx1, and all of signal electrons are readout from the photodiode to FD. At this time, the PD bottom potential is set to Vpin which is determined by the completely depleted PD. The second plot illustrates that the TX gate turns off and the PD accumulates signal electrons until exposure time 1. The third plot illustrates that at the end of exposure time 1, a skimming pulse Vtx2 is applied to the TX gate, which is smaller than Vtx1, and a part of signal electrons are readout to FD. That is, the TX gate is driven just hard enough to skim off only part of the charge. At this time, the PD upper potential is set to Vskim which is the same as the channel potential beneath TX gate. As a result, the remaining signal is Vpin–Vskim. The fourth plot illustrates that at the beginning of exposure time 2 the TX gate turns off and the PD starts to accumulate signal electrons until the end of time 2. Thus, at the end of time 2 prior to readout, the charge has increased to Vex, as illustrated in the fifth plot. The sixth plot illustrates read out after time 2. At time 2, the TX gate turns on, and all of the signal electrons are readout to FD.

Figure 1C:
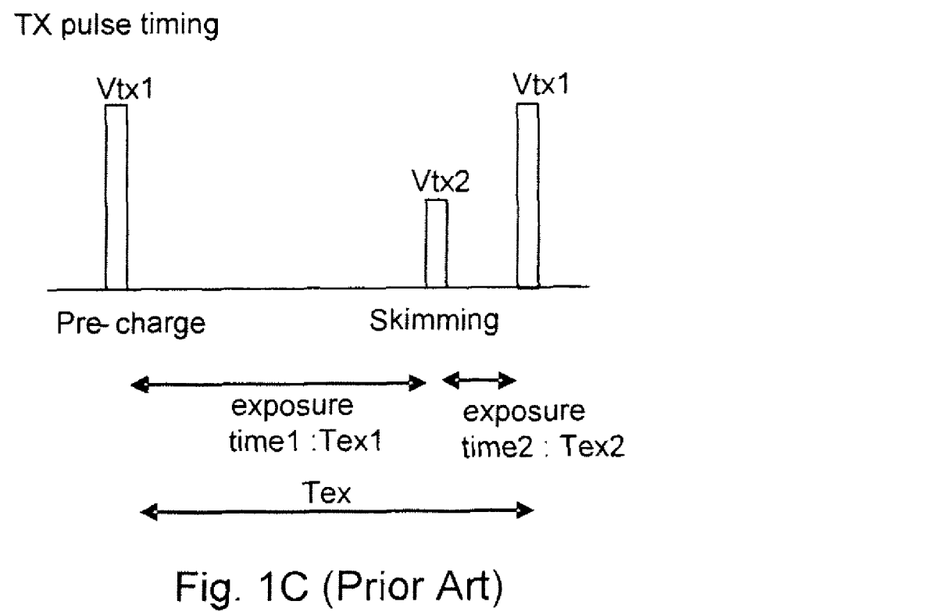

FIG. 1C is a readout timing diagram summarizing the pulse timing at the transistor TX at different times. The gate voltage Vtx1 is sufficient to turn transistor TX completely on but voltage Vtx2 only weakly turns transistor TX on during charge skimming. The different phases of operation of the unit pixel include a first exposure, charge skimming operation, and second exposure.

Figure 1D:
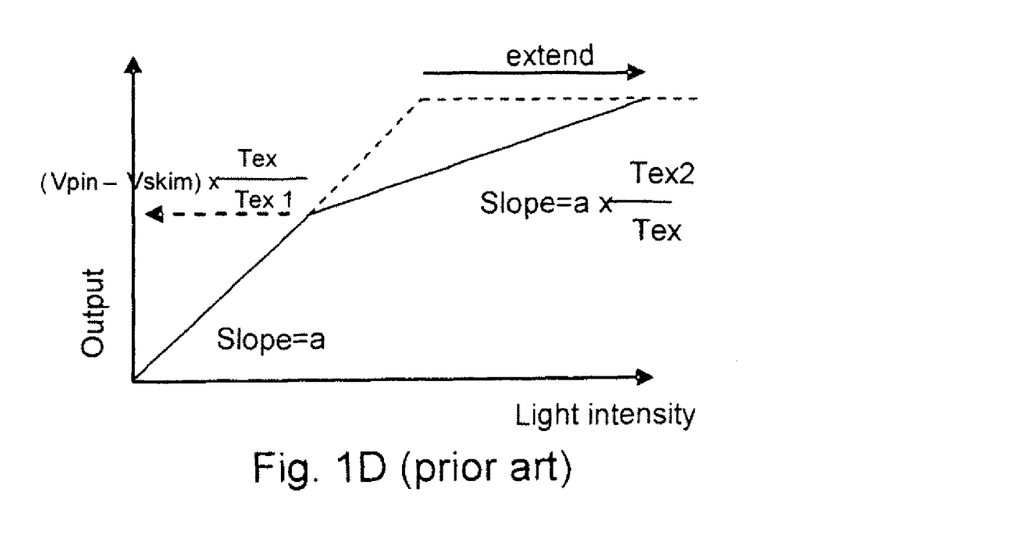

FIG. 1D illustrates how the conventional exposure time control method with charge skimming is used to extend the dynamic range. The transfer characteristic relates the output to the light intensity. The charge generated by the PD depends on the light intensity. For low light intensity conditions the transfer characteristic is linear with a slope "a" and charge skimming is not performed. When the charge skimming is performed, a smaller portion of the signal charge flows to FD. Therefore, the slope is changed from "a" to "a x Tex2/Tex". This slope is smaller than "a" and as a consequence the dynamic range is expanded.

Figure 1E:
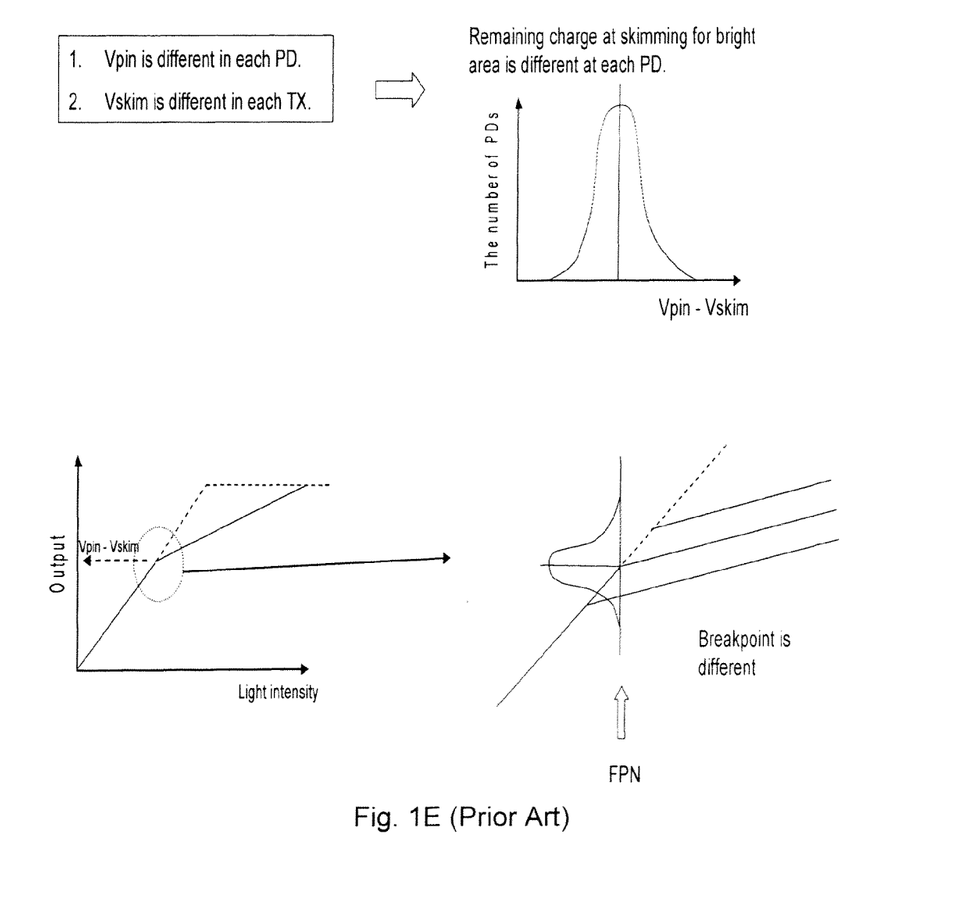

FIG. 1E illustrates some of the drawbacks of the conventional exposure time control method using charge skimming. For the example where the PD is a pinned photodiode, the bottom potential of the pinned photodiode is basically defined by the photodiode's n-type implant dosage. This bottom potential of photodiodes in an image pixel array has a distribution because of the fluctuation in LSI fabrication process. Additionally, the Vskim is different among each pixel due to the fluctuation of transfer gate (TX) threshold voltage. Each Vpin is thus different in each PD and each Vskim is different in each Tx, which results in a distribution of Vpin–Vskim. However, Vpin–Vskim is the remaining charge after skimming, which also determines the breakpoint of the transfer characteristics. These distributions in breakpoint cause fixed pattern noise in the image that degrades the image quality.

In contrast, for the case where the PD of the unit pixel is a common n-type photodiode, fixed pattern noise doesn't occur, but this type of photodiode has large leakage. As a result, the image quality is not good for low light level scenes.

Other HDR image sensor approaches that have been proposed also have drawbacks. One approach is to use photodiodes with different areas. In this approach, the image pixel array consists of two kinds of pixels with different photodiode areas. One photodiode area is a normal size, and the other is smaller. Pixels with the normal photodiode area are for low and normal light level scenes. Pixels with smaller photodiode area are for high light level scenes. The two kinds of signal are added in a digital signal processor (DSP) after compensation. As a result the dynamic range is expanded. However, one drawback of this approach is that the number of available pixels for low light level and high light level scenes is half the number of pixels in the array. This results in a degradation of the resolution if all pixels are used to create an image.

Still yet another proposed HDR image sensor utilizes a logarithmic amplifier. The sensor has a logarithmic amplifier coupled to each pixel instead of a linear amplifier. This logarithmic amplifier expands the dynamic range. But, this sensor has two major weak points. One is low sensitivity, and the other is fixed pattern noise from differences in amplitudes among the logarithmic amplifiers.

Therefore, what is desired is an improved HDR image sensor capable of 100 dB dynamic range without having other drawbacks, such as fixed pattern noise, large random noise, or degraded resolution.

SUMMARY OF THE INVENTION

An image sensor has an array of unit pixels, where each unit pixel has at least two photodiodes. The array is configured to permit independent control of the exposure times of the photodiodes within each unit pixel. A timing controller operates each unit pixel such that there is a long exposure time photodiode and a short exposure time photodiode. The timing controller's operation permits the dynamic range of the image sensor to be extended. In one embodiment the readout timing is further chosen so that short exposure time photodiodes act as overflow drains for excess charge overflowing from neighboring long exposure time photodiodes. The arrangement of long exposure time photodiodes and short exposure time photodiodes may be further alternated in the unit pixels so that a long exposure time photodiode has short exposure time photodiodes as nearest neighbors in both the vertical and horizontal dimensions. In one embodiment a microlens array preferentially focuses light into the long exposure time photodiodes to improve sensitivity.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 2:
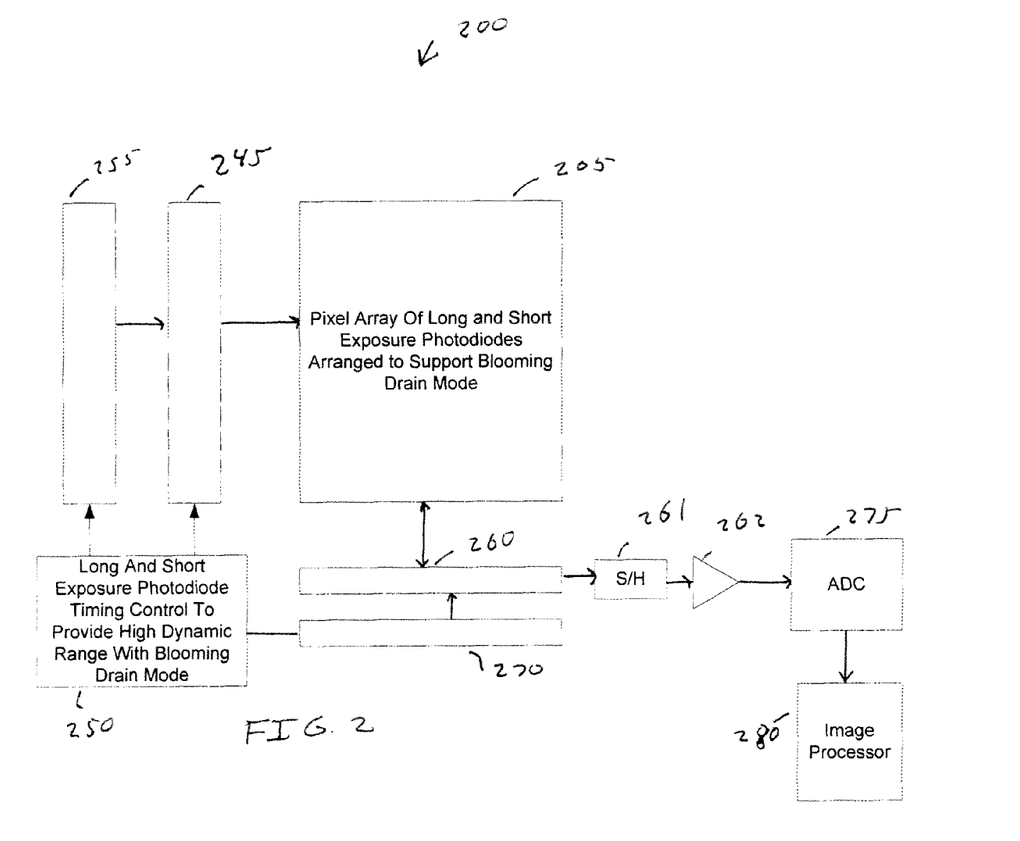
FIG. 2 is a block diagram of a high dynamic range image sensor with blooming drain in accordance with one embodiment of the present invention.

FIG. 2 is a high level block diagram of the an image sensing system 200 in accordance with one embodiment of the present invention. The image sensing system 200 includes a pixel array 205 along with a row driver 245, row decoder 255, column driver 260, column decoder 270, sample/hold block 261, amplifier 262, analog-to-DC block 275, and image processor 280. A timing and control block 250 generate signals for driving the decoders and the row driver. Separate timing signals are generated by the timing and control block 250 to operate one set of photodiodes with a long exposure time and another set of photodiodes with a short exposure time. The outputs from the long exposure time photodiodes and the short exposure time photodiodes are combined by image processor 280 to achieve a high dynamic range. Image processor 280 may, for example, be implemented as a digital signal processor.

In one embodiment each unit pixel within the pixel array 205 includes at least two photodiodes, which are operated as a long exposure time photodiode and a short exposure time photodiode. In one implementation the photodiodes within each unit cell are essentially identical photodiodes but with different exposure times. Additionally, in one embodiment the timing signals are further selected so that the short exposure time photodiodes reduce blooming by having the short exposure time photodiodes operated to act as overflow drains for excess charge overflowing from long exposure time photodiodes.

Figure 3A:
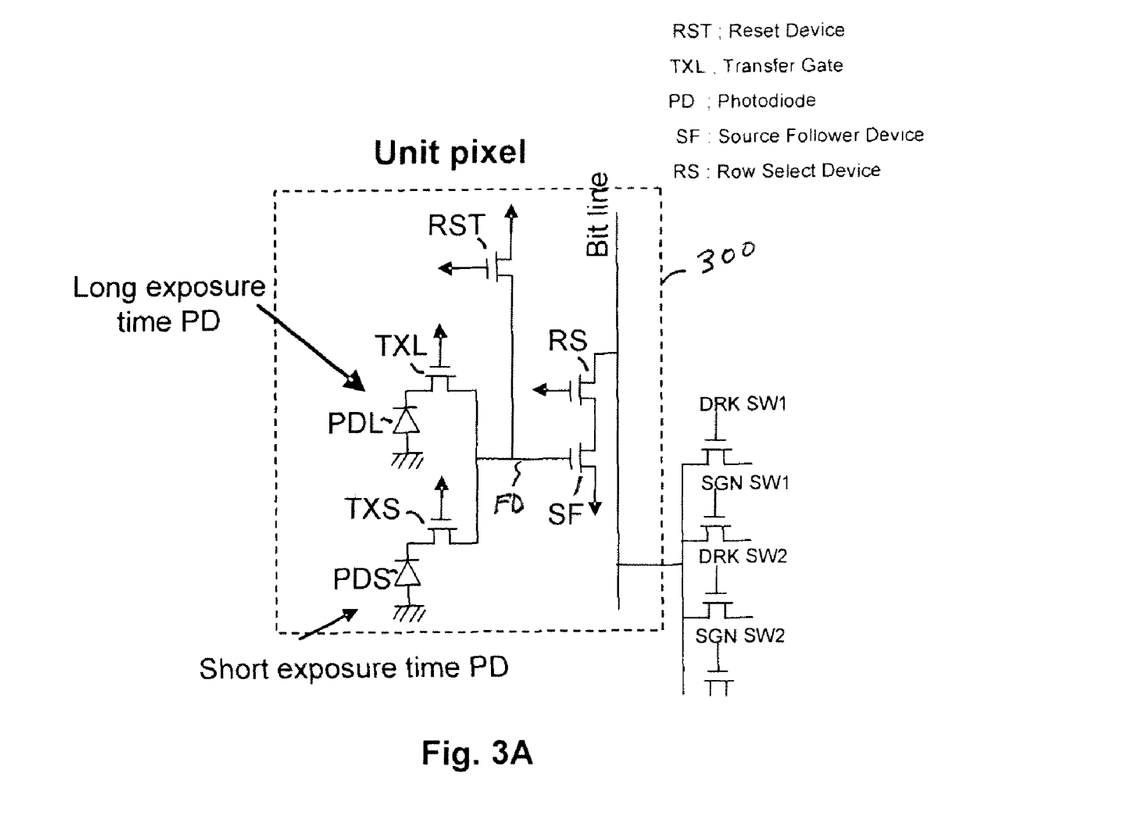
FIGS. 3A, 3B, and 3C illustrate a first embodiment of a unit pixel and associated readout timing in accordance with one embodiment of the present invention.

An exemplary individual unit pixel 300 is illustrated in FIG. 3A. The unit pixel has a long exposure time photodiode (PDL) with its own transfer transistor (TXL). The unit pixel also has a short exposure time photodiode (PDS) with its own transfer transistor (TXS). PDL and PDS both feed into a common floating diffusion (FD) node coupled to a source follower (SF) amplifier transistor. A reset transistor (RST) is coupled to the FD node. A row select (RS) transistor preferably couples the SF to a bit line. However, it is also possible to omit the RS transistor. In one embodiment, each bit line is provided with four switching devices (DRK SW1, SGN SW1, DRK SW2, and SGN SW2) and four sample hold capacitors (not shown in the figure).

Figure 3B:
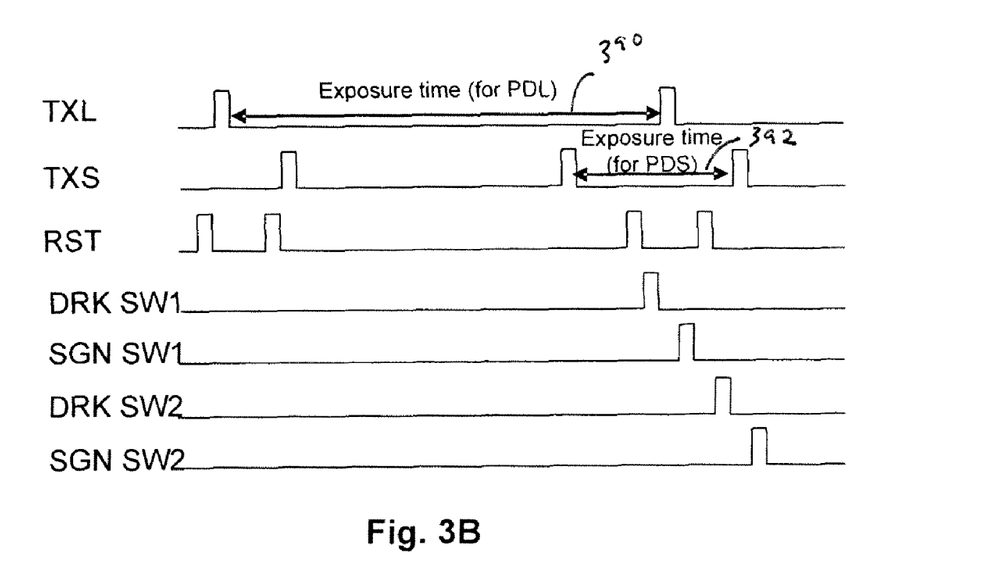
Figure 3C:
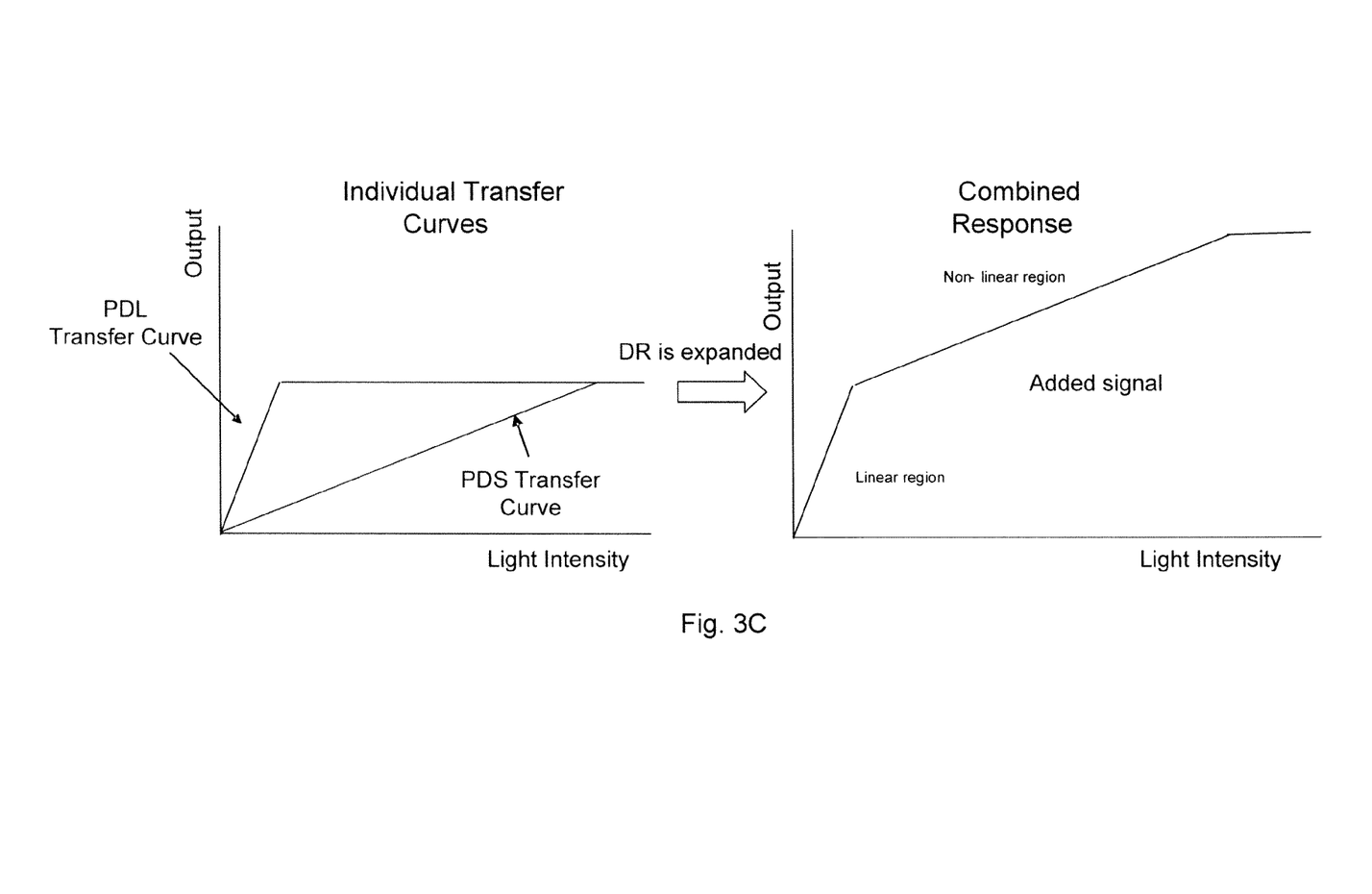

FIG. 3B illustrates readout timing for the unit pixel with the two photodiodes of FIG. 3A. Readout timing pulses for individual transistors (TXL, TXS, RST, DRK SW1, SGN SW1, DRK SW2, and SGN SW2) are shown. The two photodiodes PDL and PDS have different exposure times, as indicated by arrows 390 and 392. Since the exposure times of the two photodiodes are different, the photodiodes have different individual transfer curves as shown in the left portion of FIG. 3C. The long exposure photodiode (PDL) has higher sensitivity, but is saturated at a lower light intensity level. On the other hand, the short exposure time photodiode (PDS) is less sensitive, but becomes saturated at a higher light intensity level. The output of PDL and PDS are added by the image processor to generate a combined response transfer curve having an expanded dynamic range, as illustrated in the right portion of FIG. 3C. In this combined response transfer curve, there are two sloped regions.

Figure 4A:
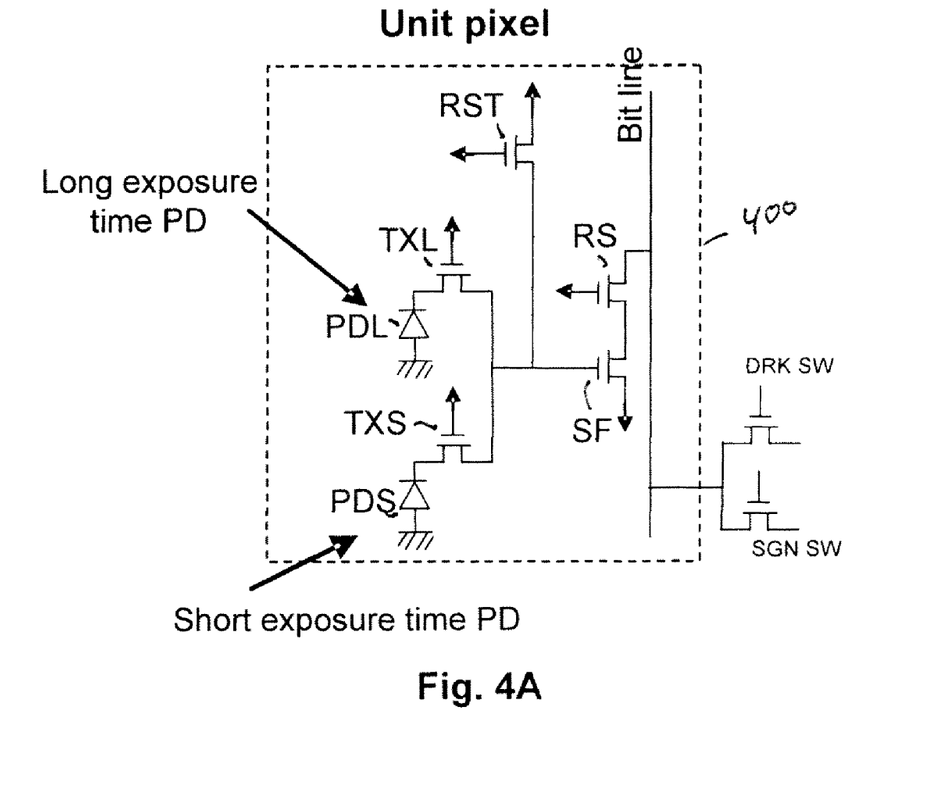
FIGS. 4A and 4B illustrate a second embodiment of a unit pixel and associated readout timing in accordance with one embodiment of the present invention.
Figure 4B:
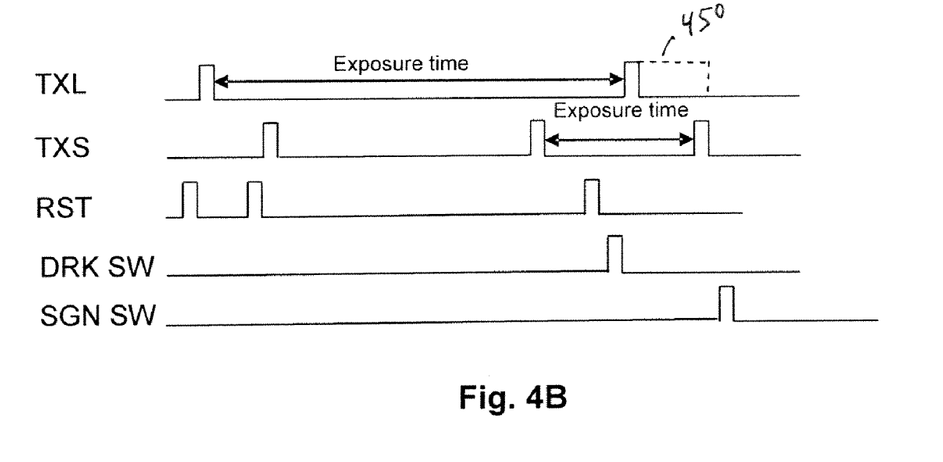

Various alternate versions of the unit pixel structure are contemplated. In particular, the number of switching devices and sample and hold capacitors in each unit pixel can be varied. In an alternate embodiment illustrated in FIG. 4A there are two switching devices (DRK SW and SGN SW) and two sample hold capacitors (not shown) associated with a unit pixel 400. The corresponding readout timing is illustrated in FIG. 4B. The TXL readout pulse may have the same pulse width as the TXS readout pulse. Alternatively, (as indicated by the dashed line 450) the TXL readout pulse width may be wider. It is also possible in an alternate embodiment of the unit pixel of FIG. 3B that the DRK SW1 and DRK SW2 can be common; for this case, the number of switching devices and sample hold capacitors are three, respectively.

Blooming occurs when a long exposure PDL fills with charge greater than the capacity of the long exposure PDL such that the excess charge overflows to neighboring pixels. Blooming is undesirable and reduces sensor resolution. In one embodiment, a blooming drain mode is supported in which the short exposure photodiodes have two functions: to act as conventional photodiodes during one portion of the readout timing cycle and to also act as drains for the long exposure photodiodes during another portion of the readout timing cycle.

Figure 5:
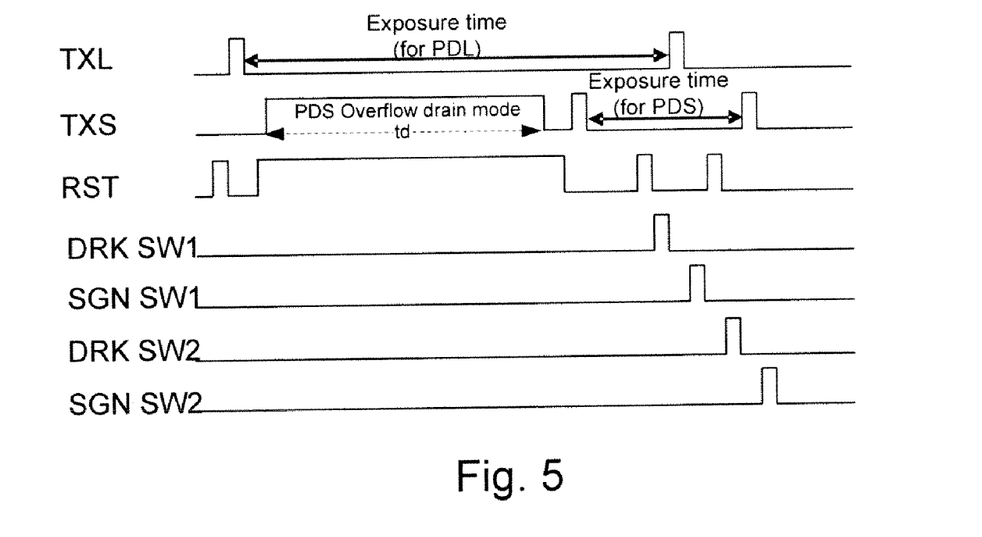
FIG. 5 illustrates a readout timing cycle for short exposure photodiodes to act as overflow drains for long exposure photodiodes in accordance with one embodiment of the present invention.

FIG. 5 illustrates an example of a readout timing cycle to minimize blooming (for a unit pixel structure similar to that illustrated in FIG. 3A). The short exposure photodiodes are operated with a readout timing such that they act as an overflow drain for the long exposure photodiodes in order to reduce blooming effects. The PDS photodiodes are operated in an overflow drain mode during a portion td of the exposure time of the PDL photodiodes. In the overflow drain mode of a PDS, both TXS and RST are both turned on to drain excess charge that overflows from PDL photodiodes into the PDS photodiode. That is, any electrons that overflow into a PDS operating in the overflow drain mode are drained through TXS and RST. However, note that the overflow drain mode occurs during a different portion of the reading timing cycle than the exposure period of PDS. Additionally, the exposure periods of PDS and PDL are offset to permit a compatible timing for reading out accumulated charge from PDS and PDL.

The effectiveness with which the short exposure time photodiodes act as overflow drains to reduce blooming depends in part on the arrangement of the PDL and PDS photodiodes in the pixel array. As previously described, blooming results when excess charge overflows from a PDL by diffusion. The effectiveness with which a PDS drains the excess charge will depend upon how close it is to the PDL and how long a border it shares with the PDL. A PDS that is a nearest neighbor of a PDL in the vertical or horizontal dimension borders the PDL along a long edge and as a result is effective at draining overflow charge. In contrast, a PDS that is a neighbor in a diagonal direction only borders along a very small triangular region and is not very effective at draining overflow charge. As a consequence, the draining is most effective for PDSs that are nearest neighbors to PDLs along a horizontal or vertical dimension.

Figure 6A:
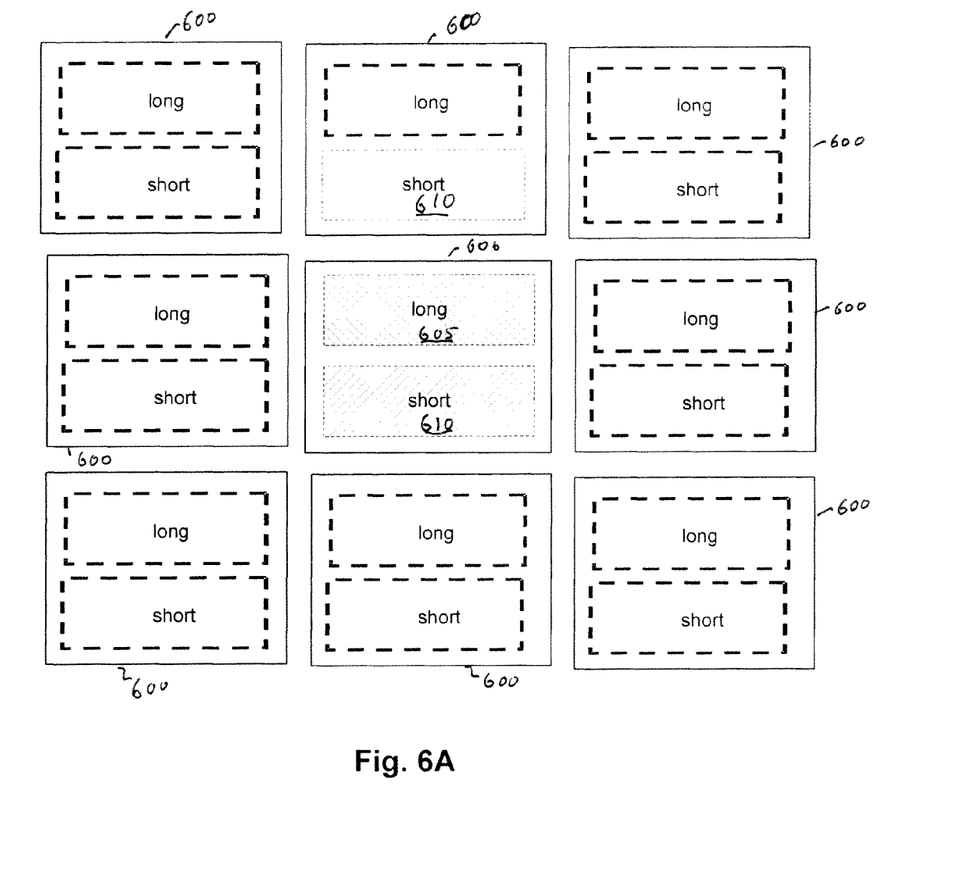
FIGS. 6A and 6B illustrate arrangements of long exposure time photodiodes and short exposure time photodiodes in neighboring unit pixels in accordance with embodiments of the present invention.
Figure 6B:
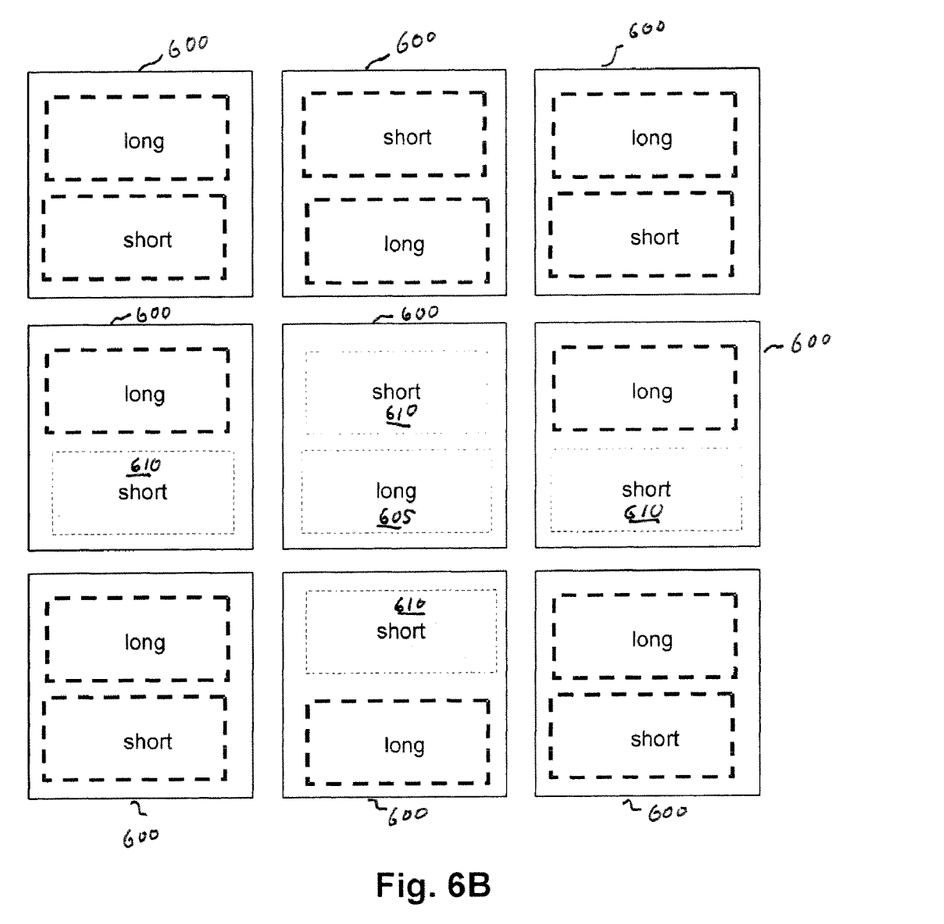

FIGS. 6A and 6B shows two exemplary arrangements of PDL and PDS photodiodes in a pixel array. In FIG. 6A each unit pixel 600 has the same orientation of PDL and PDS. That is, PDL and PDS are at same relative location of each pixel. As a result, in this example an individual PDL only has nearest neighbor PDS diodes along the vertical direction. As illustrated by the cross-hatching, the center-most PDL 605 has one nearest neighbor PDS 610 located above it and one nearest neighbor PDS 610 located below it along a vertical dimension. In FIG. 6B, the orientation of PDL and PDS photodiodes is alternated across rows of unit pixels 600. As a result, in FIG. 6B the center-most PDL is surrounded by four nearest neighbor PDSs 610. As indicated by the cross-hatching in FIG. 6B, the center-most PDL has one nearest neighbor PDS above it along the vertical dimension, one nearest neighbor PDS below it along the vertical dimension, one nearest neighbor PDS to the right in the horizontal dimension, and one to the left along the horizontal dimension. Thus, in the example of FIG. 6B the orientation of unit pixels results in a PDL having twice as many nearest neighbor PDSs along the horizontal and vertical dimensions available to act as overflow drains compared with the example of FIG. 6A.

Note that the layout of TXL and TXS metal lines needs to be considered to support independently operating the long and short exposure time photodiodes and will depend upon the arrangement of PDL and PDS photodiodes. In particular, for the case of FIG. 6B, a serpentine arrangement of TXL metal lines and a serpentine arrangement of TXS metal lines may be required to accommodate the manner in which the orientation of the long and short photodiodes alternates along rows of unit pixels.

Figure 7A:
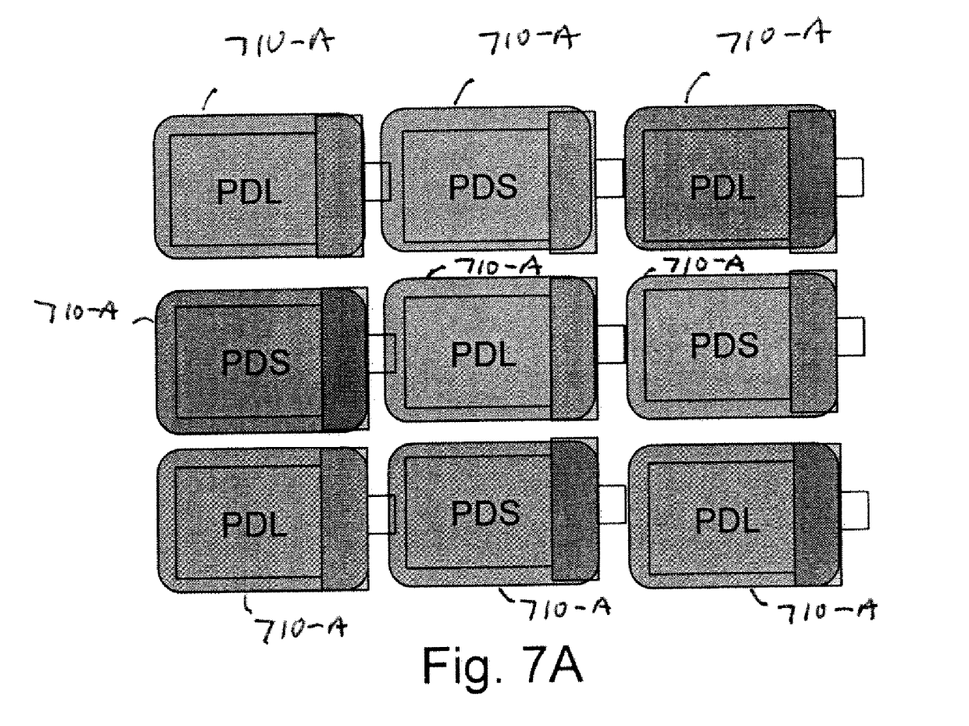
FIGS. 7A and 7B illustrate microlens arrangements in accordance with embodiments of the present invention.
Figure 7B:
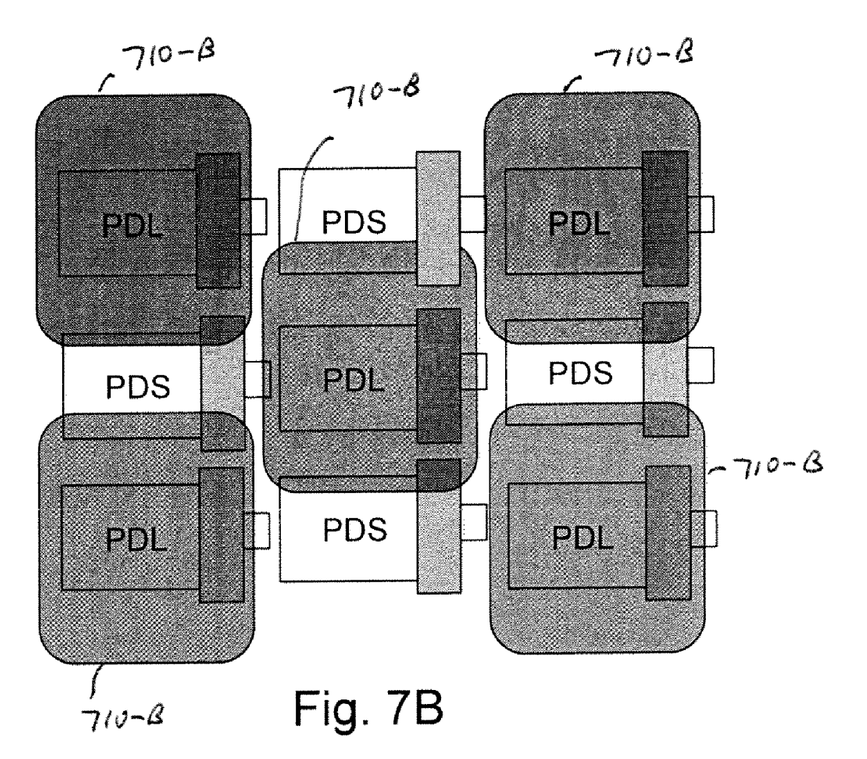

Referring to FIG. 7A, a micro-lens array having an array of individual lens elements 710-A may be used to focus light into the photodiodes. As is well known in the image sensor art, an individual photodiode occupies only a comparatively small area of a chip such that the use of additional lens elements increases the fraction of light that is coupled to the photodiodes. In this example, the area of each individual lens element 710-A is the same. That is, each PDL and PDS receives light from a microlens element 710-A having the same area. However, one potential disadvantage of having two photodiodes in each unit pixel is a reduction in sensitivity. One photodiode is a long exposure time, the other is a short exposure time. The short exposure time photodiode has reduced sensitivity (since it accumulates charge for a much smaller fraction of the readout timing cycle than the long exposure photodiode). Thus, while the dynamic range is increased, a downside is that the sensitivity is also reduced. In the worst case the sensitivity is reduced to up to half that of a normal sensor. To improve the low sensitivity, in one embodiment the microlens array is designed to preferentially focus a larger percentage of the light into the PDLs than the PDSs. This can be accomplishing by scaling the relative areas of individual lens elements used for the PDLs and PDSs to have different values. In one embodiment, a micro-lens 710-B is provided to only the PDL as illustrated in FIG. 7B. This permits the micro-lens element 710-B to be much larger than the micro-lens element 710-A of normal alignment of FIG. 7A. Alternatively, it is possible that each PDS just has microlens that is smaller than that of the PDLs. Conventional micro-lens fabrication technology may be used to fabricate a microlens array that preferentially couples light to the PDLs. For example, U.S. Pat. No. 6,818,934, "Image sensor having micro-lens array separated with trench structure and method of making," by Yamamoto describes an exemplary micro-lens fabrication process and is hereby incorporated by reference. Note that the microlens embodiment may be practiced independently of the overflow drain mode.

The present invention provides several advantages over HDR sensors known in the prior art. In particular, a sensor in accordance with the present invention may be implemented to have a 100 dB dynamic range but without the degradation of resolution, fixed pattern noise and large random noise of prior art HDR sensors. In particular, while the transfer curve has a similar shape as the exposure time control method known in the prior art, the unit pixel structure and readout timing of the present invention are different. Unlike the exposure time control method of the prior art, there is no fixed pattern noise in the present invention with a two photodiode structure, even if these two photodiodes are pinned photodiodes. Additionally, the readout timing and arrangement of photodiodes in embodiments of the present invention may be selected to utilize an overflow drain mode to improve blooming characteristics.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An image sensor with extended dynamic range and reduced blooming, comprising:
    an array of unit pixels, each unit pixel having at least two photodiodes, the array configured to permit independent control of the exposure time of the photodiodes within each unit pixel; and
    a timing controller selecting a readout timing in which each unit pixel has a long exposure time photodiode and a short exposure time photodiode, with the readout timing further chosen so that short exposure time photodiodes act as drains for excess charge overflowing from neighboring long exposure time photodiodes,
    wherein the orientation of the long exposure time photodiode and the short exposure time photodiode within each unit pixel is alternated so that a long exposure time photodiode is neighbored by two short exposure time photodiodes along the vertical dimension and neighbored by two short exposure time photodiodes along the horizontal dimension.

2. The image sensor of claim 1, wherein the short exposure time photodiode in each unit pixel is coupled to a floating node by a transfer gate with the floating node in each unit pixel being further coupled to a reset device, the short exposure time photodiodes acting as drains during a first portion of a readout cycle during which the transfer gate and reset device are both activated to drain charge from the short exposure time photodiodes.

3. The image sensor of claim 1, further comprising a micro-lens array, the micro-lens array having lens elements for the long exposure time photodiodes that preferentially couple a larger percentage of incoming light to the long exposure time photodiodes to improve sensitivity.

4. The image sensor of claim 3, wherein the micro-lens array has lens elements for only the long exposure time photodiodes.

5. The image sensor of claim 3, wherein the micro-lens array has lens elements for each photodiode with the long exposure time photodiodes having lens elements with a greater area than the short exposure time photodiodes.

6. The image sensor of claim 1, further comprising a processor to combine data from the long exposure time photodiode and the short exposure time photodiode in each unit cell to extend the dynamic range.

7. A high dynamic range image sensor with reduced blooming, comprising:
    an array of unit pixels, each unit pixel having a long exposure time photodiode and a short exposure time photodiode, the array of unit pixels having electrical connections to permit independent control of the long exposure time photodiodes and the short exposure time photodiodes;
    an address decoder coupled to the array of unit pixels;
    a timing controller coupled to the address decoder to generate readout timing control signals in which during a portion of a readout cycle the short exposure time photodiodes act as drains for excess charge overflowing from neighboring long exposure time photodiodes,
    wherein the orientation of the long exposure time photodiode and the short exposure time photodiode within the unit pixels is alternated so that a long exposure time photodiode is neighbored by a short exposure time photodiodes along both vertical and horizontal directions of the array.

8. The image sensor of claim 7, wherein within each unit pixel the long exposure time photodiode is coupled by a first transfer gate transistor to a floating node, the short exposure time photodiode is coupled by a second transfer gate transistor to the floating node, a reset device is coupled to the floating node, and an amplifier device is coupled to the floating node.

9. The image sensor of claim 8, wherein the second transfer gate transistor and the reset device are activated to operate the short exposure photodiodes as drains for the long exposure photodiodes.

10. The image sensor of claim 7, further comprising a micro-lens array, the micro-lens array having lens elements for the long exposure time photodiodes that preferential couple a larger percentage of incoming light to the long exposure time photodiodes to improve sensitivity.

11. The image sensor of claim 10, wherein the micro-lens array only has lens elements for the long exposure time photodiodes.

12. The image sensor of claim 10, wherein the micro-lens array has lens elements for each photodiode with the long exposure time photodiodes having lens elements with a greater area than the short exposure time photodiodes.

13. A method of improving dynamic range and also reducing blooming in an image sensor having an array of photodiodes in which each unit pixel has at least two photodiodes, comprising:
    operating a first set of photodiodes as long exposure time photodiodes in a first portion of a readout timing cycle;
    operating a second set of photodiodes as short exposure time photodiodes in a second portion of the readout timing cycle, and
    in a third portion of the readout timing cycle, further operating the second set of photodiodes as drains for excess charge overflowing from neighboring long exposure time photodiodes,
    wherein the third portion of the readout timing cycle overlaps with the first portion of the readout cycle so that the second set of photodiodes drain excess charge during the exposure time of the first set of photodiodes,
    wherein the exposure timing of the first set of photodiodes and the second set of photodiodes is offset to permit separate readout of long exposure time photodiodes and short exposure time photodiodes in each unit pixel.

14. The method of claim 13, wherein the first set of photodiodes and the second set of photodiodes are organized so that long exposure time photodiodes have short exposure time photodiodes as nearest neighbors in both the horizontal and vertical dimensions.

15. The method of claim 13, further comprising combining outputs of photodiodes having different exposure times for common unit pixels.

* * * * *